(12) United States Patent
Meyer

(10) Patent No.: US 11,168,672 B2
(45) Date of Patent: Nov. 9, 2021

(54) MOUNTING OF AN INTERMEDIATE SHAFT IN PARTICULAR OF A WIND GEARBOX

(71) Applicant: Flender GmbH, Bocholt (DE)

(72) Inventor: Thomas Meyer, Stolberg (DE)

(73) Assignee: FLENDER GMBH, Bocholt (DE)

( * ) Notice: Subject to any disclaimer, the term of this patent is extended or adjusted under 35 U.S.C. 154(b) by 66 days.

(21) Appl. No.: 16/616,290

(22) PCT Filed: May 29, 2018

(86) PCT No.: PCT/EP2018/064052
§ 371 (c)(1),
(2) Date: Nov. 22, 2019

(87) PCT Pub. No.: WO2018/219939
PCT Pub. Date: Dec. 6, 2018

(65) Prior Publication Data
US 2020/0088173 A1 Mar. 19, 2020

(30) Foreign Application Priority Data
May 31, 2017 (DE) .................... 10 2017 209 217.3

(51) Int. Cl.
*F16H 57/021* (2012.01)
*F03D 80/70* (2016.01)
(Continued)

(52) U.S. Cl.
CPC ............ *F03D 80/70* (2016.05); *F03D 15/00* (2016.05); *F05B 2260/40311* (2013.01);
(Continued)

(58) Field of Classification Search
CPC .................... F03D 80/70; F03D 15/00; F05B 2260/40311; F16C 17/02; F16C 17/26;
(Continued)

(56) References Cited

U.S. PATENT DOCUMENTS 5,863,133 A * 1/1999 New ..................... F16C 33/103
384/114
6,939,046 B2 * 9/2005 Oelsch .................. F16C 17/026
384/100
(Continued)

FOREIGN PATENT DOCUMENTS

| CN | 1181466 A | 5/1998 |
|----|-----------|--------|
| CN | 1796810 A | 7/2006 |

(Continued)

OTHER PUBLICATIONS

Machine translation of CN 203161832 filed Mar. 8, 2021 (Year: 2021).*
(Continued)

*Primary Examiner* — Tisha D Lewis
(74) *Attorney, Agent, or Firm* — Henry M. Feiereisen LLC

(57) ABSTRACT

A mounting of an intermediate shaft of a gearbox includes a gear element disposed between a first shaft end and a second shaft end of the intermediate shaft. A first radial bearing is disposed at the first shaft end of the intermediate shaft, a second radial bearing is disposed at the second shaft end of the intermediate shaft, a first axial bearing is disposed at the first shaft end of the intermediate shaft, and a second axial bearing is disposed at the second shaft end of the intermediate shaft.

16 Claims, 2 Drawing Sheets

(51) Int. Cl.
*F03D 15/00* (2016.01)
*F16C 17/02* (2006.01)
*F16C 17/26* (2006.01)

(52) U.S. Cl.
CPC .............. *F16C 17/02* (2013.01); *F16C 17/26* (2013.01); *F16C 2360/31* (2013.01); *F16C 2361/61* (2013.01); *F16H 57/021* (2013.01)

(58) Field of Classification Search
CPC . F16C 2360/31; F16C 2361/61; F16H 57/021
See application file for complete search history.

(56) References Cited

U.S. PATENT DOCUMENTS

| | | | |
|---|---|---|---|
| 8,215,198 B2 * | 7/2012 | Masuo | B23Q 5/56 74/409 |
| 2006/0078241 A1 | 4/2006 | Moehring | |
| 2010/0064833 A1 | 3/2010 | Masuo et al. | |
| 2013/0251295 A1 | 9/2013 | Gaisser | |
| 2015/0291151 A1 * | 10/2015 | Shigeta | B60W 20/15 701/22 |

FOREIGN PATENT DOCUMENTS

| | | | | |
|---|---|---|---|---|
| CN | 103062219 A | | 4/2013 | |
| CN | 203161832 U | * | 8/2013 | .............. F16C 27/04 |
| CN | 103303356 A | * | 9/2013 | .............. B62D 1/20 |
| CN | 103557271 A | | 2/2014 | |
| CN | 104791381 A | | 7/2015 | |
| DE | 3827741 A | * | 6/1989 | .............. F02P 7/067 |
| DE | 20218170 U1 | | 8/2003 | |
| DE | 602004007836 T2 | | 5/2008 | |
| JP | S57155191 U | | 9/1982 | |
| JP | 2008106894 A | | 5/2008 | |
| WO | WO 2009052824 A2 | | 4/2009 | |

OTHER PUBLICATIONS

Machine translation of CN 103303356A filed Mar. 8, 2021 (Year: 2021).*
PCT International Examination Report and Written Opinion of International Examination Authority dated Aug. 30, 2018 corresponding to PCT International Application No. PCT/EP2018/064052 filed May 29, 2018.

* cited by examiner

MOUNTING OF AN INTERMEDIATE SHAFT IN PARTICULAR OF A WIND GEARBOX

CROSS-REFERENCES TO RELATED APPLICATIONS

This application is the U.S. National Stage of International Application No. PCT/EP2018/064052, filed May 29, 2018, which designated the United States and has been published as International Publication No. WO 2018/219939 A1 and which claims the priority of German Patent Application, Ser. No. 10 2017 209 217.3, filed May 31, 2017, pursuant to 35 U.S.C. 119(a)-(d).

BACKGROUND OF THE INVENTION

The invention relates to a mounting of an intermediate shaft of a gearbox, in particular of a wind gearbox, that is of a gearbox for a wind power plant and an operating method.

Gearboxes can be employed in various applications. Gearboxes are thus used, for example, in maritime drive systems, but also in wind power plants or in other industrial areas of application. The gearbox is for example a spur gear unit, which in particular has helical teeth. A gearbox has in particular an intermediate shaft, wherein this shaft for example takes the form of a two-stage spur gear part Planetary gears too can for example be employed in wind power plants.

In the case of wind power plants, as also in drives used in vehicles (for example ships, locomotives, trucks, etc.), installation space is frequently limited.

SUMMARY OF THE INVENTION

It is a task of the present invention to specify a compact mounting for a gearbox.

According to one aspect of the invention, a solution to the problem emerges from a mounting of an intermediate shaft of a gearbox, wherein the intermediate shaft has a first shaft end and a second shaft end, wherein there is a gear element between the first shaft end and the second shaft end, wherein a first radial bearing is at the first shaft end, wherein a second radial bearing is at the second shaft end, wherein a first axial bearing is at the first shaft end and a second axial bearing is at the second shaft end.

According to another aspect of the invention, the problem is solved by a wind gearbox as including a mounting as set forth above.

According to still another aspect of the invention, the problem is solved by a method for operating a wind gearbox as set forth above, wherein a compression time of the reversing bearing is selected that corresponds to a frequency of a change in load.

A mounting of an intermediate shaft of a gearbox has the intermediate shaft, wherein the intermediate shaft has a first shaft end and a second shaft end, wherein at least one gear element is located between the first shaft end and the second shaft end. The gear element is for example a gear wheel located on the intermediate shaft or a sprocket, etc. integrated into the shaft. In the case of the mounting there is a first radial bearing at the first shaft end and a second radial bearing for the second shaft end, wherein there is also a first axial bearing on the first shaft end and a second axial bearing on the second shaft end. On the shaft end means in the area of the end of the shaft, wherein this end area can intersect axially with the shaft, but can also extend beyond the axial expansion of the shaft. The radial bearing at least predominantly takes up forces that run radially. The axial bearing at least predominantly takes up forces that run axially. Through the axial bearing or through a multiplicity of axial bearings a shaft can be prevented from performing axial movements in an impermissible manner. Both in the industrial application of mountings (industrial mountings), as also in the case of wind gearboxes (for example a spur gear unit with helical toothing) axial forces can arise which are to be absorbed by an axial bearing. Bearings such as axial bearings and/or radial bearings can for example be embodied as slide bearings, ball bearings, spherical roller bearings, etc. The necessary installation space for a fixed bearing unit (the fixed bearing unit has in particular a radial bearing and two axial slide bearings) with its combination of for example axial slide bearings with a radial slide bearing is very large as a result of the arrangement, as the internal diameter of the axial bearing is greater than the radial bearing diameter. This has the result that the radial bearings in particular with a small installation height do not lead to beneficial installation space advantages. The result is that appropriate intermediate bodies are employed to accommodate the bearing components, which are fixed in the housing-bearing block. If the fixed bearing unit is now dispensed with, it is possible to manage without intermediate body and to use the minimal installation space which the radial slide bearings alone require for the housing structure and its optimization. The optimization of the linkage of the radial bearings is successful if this is accommodated directly in the housing structure. If no fixed bearing unit is now present, that is this is dispensed with, the function of the two axial slide bearings of the fixed bearing unit can be transferred into the position of the respective shaft ends (shaft end face). The shaft has also two shaft ends, in the area of which axial bearings, in particular axial slide bearings, are now positioned. In this position the possibility exists of using the components of the gearbox, such as for example a cover and/or a housing structure (in particular an internal housing structure), for the adaption of the axial bearing. The shaft ends are also available for this purpose. By means of an installation space for the axial bearing (in particular axial slide bearing) in the area of the shaft ends a compact construction of a mounting and thus for example also of a gearbox is possible. The shaft is here in particular an intermediate shaft of a gearbox. Thus the axial mounting is now not in conjunction with a radial bearing in a fixed bearing unit, but is positioned detached from this on the shaft ends. Certain advantages can thereby be achieved:

- less installation space for the axial mounting;
- fewer components;
- cost reduction through lower usage of material and/or
- optimization of the housing structure in the case of lower usage of material.

In one embodiment of the mounting the first radial bearing is a floating bearing. The floating bearing is in particular a slide bearing. The thus mounted shaft is thereby rotatably mounted.

In one embodiment of the mounting the second radial bearing is a floating bearing. The floating bearing is in particular a slide bearing. The thus mounted shaft is thereby rotatably mounted.

In one embodiment of the mounting the first axial bearing is fixed in a housing of the gearbox. The interior of the housing is here in particular formed in such a way that accommodation and fixing can take place in a space-saving manner.

In one embodiment of the mounting the second axial bearing is fixed by means of a cover of the housing of the gearbox. A smaller installation space can thereby be realized and/or exchange of the second axial bearing facilitated. As well as the exchange of the second axial bearing via the opening which the cover closes, the two radial bearings, the shaft and/or the first axial bearing can also be exchanged.

In one embodiment of the mounting the first axial bearing is connected to a first oil sump. The oil in the oil sump serves to lubricate the bearing.

In one embodiment of the mounting the second axial bearing is connected to a second oil sump. The oil in the oil sump serves to lubricate the bearing.

In one embodiment of the mounting the first oil sump is connected to the second oil sump in such a way that oil can find its way from the first oil sump to the second oil sump and vice versa. Thus for example oil can be forced out of the first oil sump and reach the second oil sump, and vice versa. This can, for example, occur in the case of a change in load, an emergency stop or during reversing operation of a gearbox.

In one embodiment of the mounting this has an axial bearing, which is a reversing axial bearing, wherein this is designed as a displacement pressure bearing. The first axial bearing is thus for example a reversing axial bearing. An oil sump belonging to the axial bearing can be located in the area of the shaft end face. The oil sump compartment thus embodied is in particular enclosed by the housing cover, the shaft end with or without thrust washer and/or a drilled hole in the housing. In the case of oil sump lubrication the direct pressure oil supply for the axial bearing on the shaft end does not apply. An oil drain positioned at 11 o'clock or 1 o'clock for example limits the oil level of the local oil sump. The oil sump has the advantage compared with the pressure oil supply that the gap can always have a 100% oil filling level. As the reversing load has a time-limited, dynamically oscillating character, the possibility thus exists of not designing the bearing in a stationary manner, but dynamically as a squeeze film damper. A change in load takes place for example on average around every 0.37 sec for an emergency turbine stop.

The following advantages or lubrication solutions can be achieved by means of the described mounting:
   sump lubrication for the axial bearing;
   designing of the reversing axial bearing as a squeeze film damper (displacement pressure buildup) and/or
   dispensing with pressure lubrication for the reversing bearing.

In one embodiment of the mounting the radial expansion of the first radial bearing is smaller than the radial expansion of the first axial bearing. A compact structure can thus be achieved.

In one embodiment of the mounting the radial expansion of the second radial bearing is smaller than the radial expansion of the second axial bearing. A compact construction can thus also be achieved.

In one embodiment of the mounting the second axial bearing is designed for a greater number of operating hours, in particular double the number of operating hours, than the first axial bearing. After opening of the housing cover the second axial bearing is more readily accessible than the first axial bearing, as the second axial bearing is located directly behind the housing cover. The replacement of a more easily accessible bearing reduces the downtime of the bearing when this is under maintenance.

In one embodiment of the mounting the first axial bearing abuts a first shaft end face and/or the second axial bearing abuts a second shaft end face. If the axial bearings are directly abutting, this thus contributes to a compact construction.

In one embodiment of the mounting at least one shaft end face is adapted to at least one of the axial bearings by means of a thrust washer. Differences in size between axial bearing and shaft end face can thus be balanced out. Thus if for example the shaft ends are too small, the possibility exists of adapting the thrust washers to the shaft ends, which then function as a counter running surface. This method can also be partially implemented, for example by continuing, on the intermediate shaft of a gearbox, to use the wheel as a running surface for the axial bearing, which is then adapted to the internal wall of the housing.

In one embodiment of the mounting at least one of the axial bearings is a reversing axial bearing, wherein this is in particular embodied as a displacement pressure bearing. This reduces the complexity of the lubrication.

A wind gearbox advantageously has a mounting according to at least one of the embodiments described. The embodiments can be combined with each other. A space-saving gearbox with a mounting of this kind can thus be realized, which for example is of benefit in the confined space conditions in a nacelle of a wind power plant.

In one embodiment of the wind gearbox this has an intermediate shaft, wherein this is an intermediate shaft of a two-stage spur gear portion of the wind gearbox.

In one embodiment of the wind gearbox a reversing bearing has a lubrication gap of greater than 0.5 mm. If there is oil in this lubrication gap, this can be partially forced out of the gap in the case of a change in load, which has a damping effect.

In one method for operating a wind gearbox a compression time of the reversing bearing is selected which corresponds to a frequency of a change in load. To this end in particular the reversing axial bearing is designed as a displacement pressure bearing. In addition, an oil sump would be provided in the area of at least one of the shaft end faces. The oil sump compartment is for example enclosed by the housing cover, a shaft end with thrust washer and/or a drilled hole in the housing. In the case of oil sump-lubrication the direct pressure oil supply for the axial bearing on the shaft end does not apply. The oil sump has the advantage compared with the pressure oil supply that the gap preferably always has a 100% oil filling level. As the reversing load has a time-limited, dynamically oscillating character, the possibility thus exists of not designing the bearing in a stationary manner, but dynamically as a squeeze film damper. As a result of the overall axial play in normal operation the reversing bearing has a large gap (because it is not under load) and consequently upon the occurrence of a reversing load from the normal loading state, a large initial lubrication gap in the order of magnitude of, for example, greater than 0.5 mm.

In one embodiment of the method the compression time selected is greater than an impact time. This means that the lubrication gap has to be large enough that the gap is not reduced to 0 mm during an impact. Here, the time that the bearing requires to overcome the axial play is called the compression time. The compression time of the reversing axial bearing accordingly lies in the order of magnitude of the frequency of the change in load. The amplitude time from the occurrence of the reversing impact to the next zero-crossing then amounts to, for example, 0.37 sec (impact duration). If, taking account of the inertias and frictional resistances, the compression time of the reversing bearing is greater than the impact duration, no contact with the sliding surfaces takes place.

BRIEF DESCRIPTION OF THE DRAWING

By way of example, the invention is explained in greater detail below on the basis of exemplary embodiments with reference to the attached drawings, wherein similar elements are shown with the same reference characters. The drawings show.

DETAILED DESCRIPTION OF PREFERRED EMBODIMENTS

Figure 1:
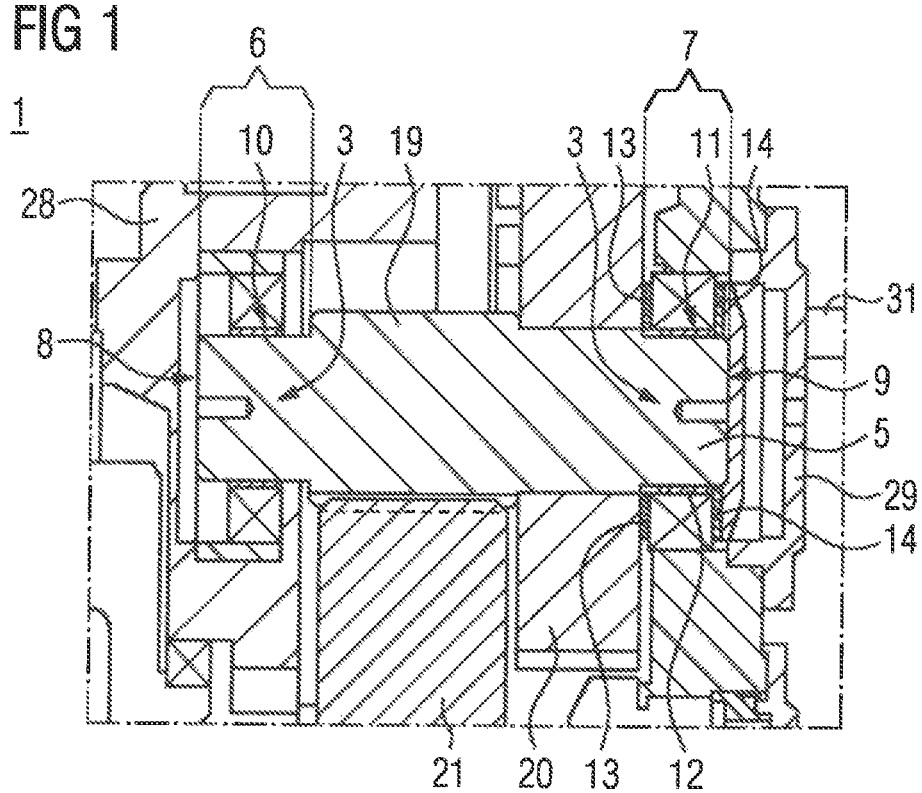
FIG. 1 a first mounting with an intermediate shaft.

The representation according to FIG. 1 shows, in sectional form, a first wind gearbox 1, which has a mounting 3 and a gearbox housing 28. The mounting 3 has a floating bearing 10 and a fixed bearing unit with steel adapter 11. The floating bearing 10 is for example a radial slide bearing. The fixed bearing unit 11 has a steel adapter, a left-hand axial mounting 13 and a right-hand axial mounting 14, as well as a radial mounting 12. An intermediate shaft 5 of the gearbox 1 is mounted by means of the mounting 3. The intermediate shaft 5 has a first shaft end 6, that is a first shaft end area 6. A first shaft end face 8 is located at the first shaft end 6. The floating bearing 10 is located in the area of the first shaft end 6. A second shaft end face 9 is located on the second shaft end 7. The fixed bearing unit 11 is located in the area of the second shaft end 7. This fixed bearing unit is accessible via a gearbox housing cover 29. Gear elements are located between the first shaft end 6 and the second shaft end 7. A first gear element is toothing 19 integrated into the intermediate shaft 5. A second gear element is a first gear wheel 20 on the intermediate shaft 5. A second gear wheel 21 engages in the toothing 19. The first gear wheel 20 is provided for the transmission of forces to a connection shaft 31.

Thus according to FIG. 1 an intermediate shaft 5 of a two-stage spur gear portion of a wind gearbox 1, with steel bodies to accommodate the large axial slide bearings 13 and 14 in the fixed bearing unit, is shown on the right. The fixed bearing unit can be optimized to the effect that existing gearbox components are used as a counter running surface. Thus on the intermediate shaft 5 the gear wheel can be used as a counter running surface. However this is not possible in the case of all shafts in the spur gear unit, as the toothings do not always enable this due to their size (reason: excessively small pinion teeth).

The required installation space of axial slide bearings in combination with a radial slide bearing (fixed bearing unit 11 with a radial bearing and two axial slide bearings) is very large as a result of the arrangement, as the internal diameter of the axial bearing is greater than the radial bearing diameter. The result is that the radial bearings with their low design height do not lead to the desired installation space advantages. This means that corresponding intermediate bodies must be employed to accommodate the bearing components, which must be fixed in the housing-bearing block. The aim is to manage without the intermediate bodies and to use the minimal installation space, which the radial slide bearings alone require, for the housing structure and its optimization. The optimization of the linkage of the radial bearings is successful if these can be accommodated directly in the housing structure. The fixed bearing unit can also be improved to the effect that existing gearbox components are used as a counter running surface. Thus on the intermediate shaft 5 the gear wheel 20 can be used as a counter running surface.

Figure 2:
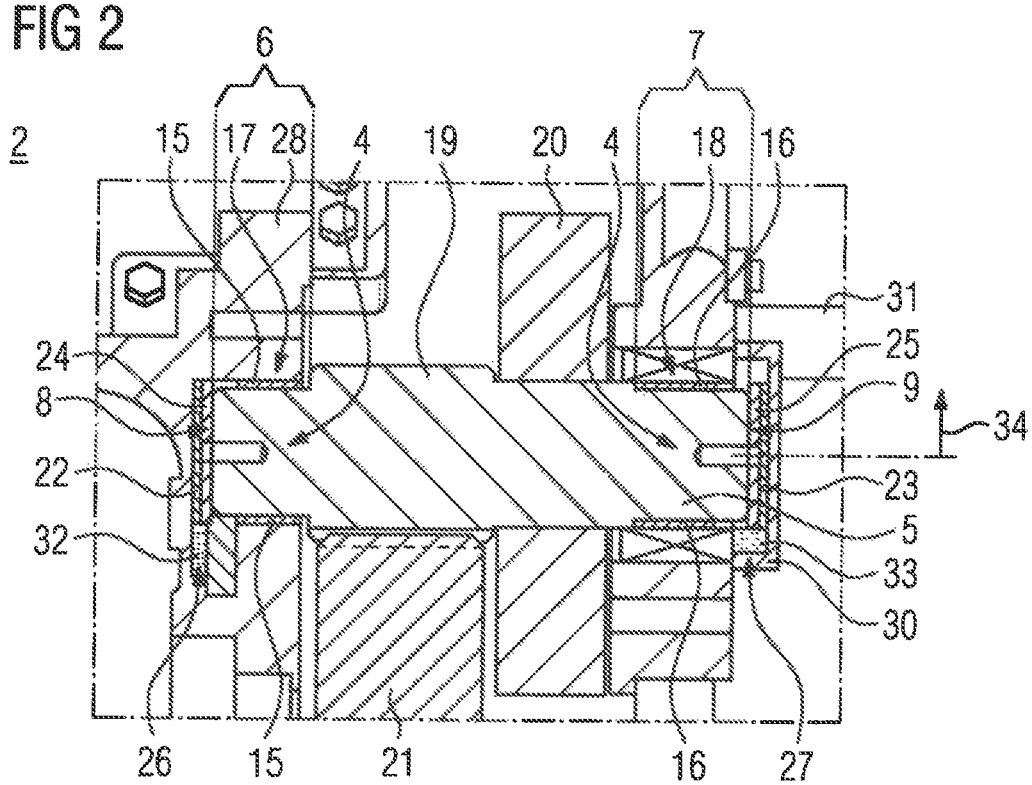
FIG. 2 a second mounting with an intermediate shaft, and
FIG. 3 a torque profile for a gearbox of a wind power plant as a function of the rotational speed.

The representation according to FIG. 2 shows, in sectional form, a further wind gearbox 2, wherein the principle of an axial slide bearing on the shaft ends with oil sump is shown. An intermediate shaft 5 which has a first bearing block 17 for a first radial bearing 15 on the first shaft end 6 is shown. On the second shaft end 7 is a second bearing block 18 for a second radial bearing 16. A first axial bearing 22 with a first thrust washer 24 is located at the first shaft end face 8. A first oil sump 32 for lubrication of the first axial bearing 22 is located in a first oil sump compartment 26. A second axial bearing 23 with a radial expansion 34 is located at the second shaft end face 9. A second thrust washer 25 is located between the second axial bearing 23 and the second shaft end face 9. A second oil sump 33 for lubrication of the second axial bearing 23 is located in a second oil sump compartment 27. The second axial bearing 23 is fixed by the gearbox housing cover 30. The mounting 4 according to FIG. 2 has the first radial bearing 15 and the first axial bearing 22 at or on the first shaft end 6. The mounting 4 has the second radial bearing 16 and the second axial bearing 23 at or on the second shaft end 7.

Figure 3:
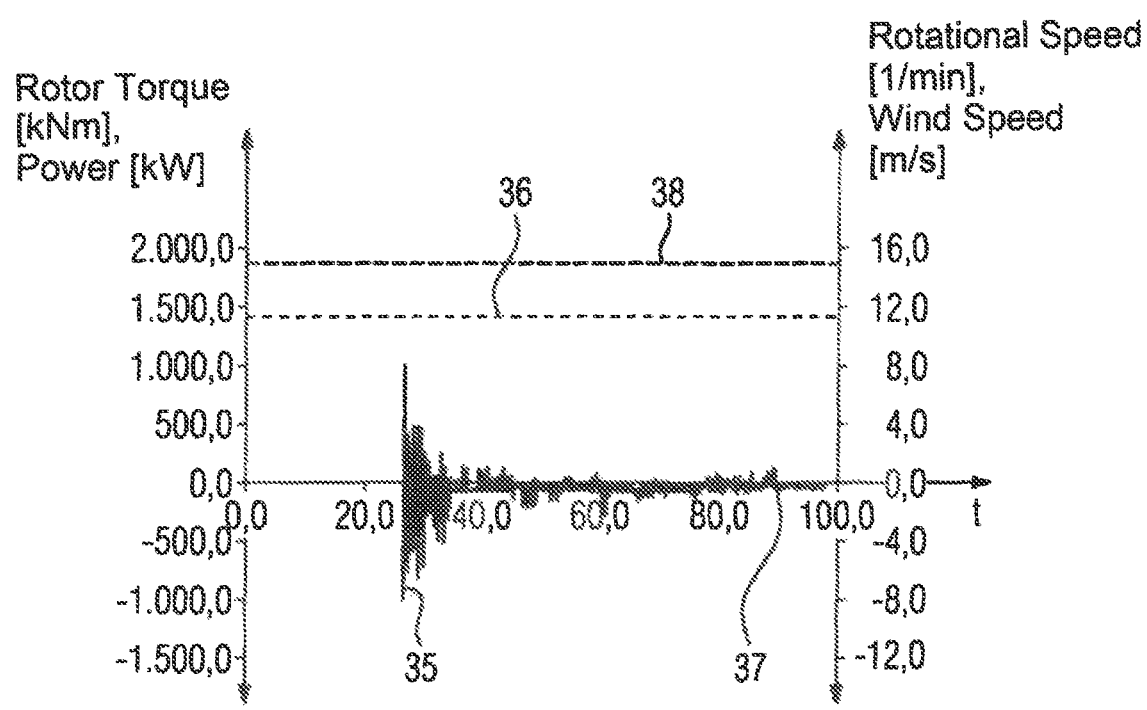

The representation according to FIG. 3 shows a torque profile for a gearbox of a wind power plant depending on the rotational speed in particular the progress of rotational speed and torque of an emergency stop of a wind power plant. The figure shows how with an emergency stop the torque value (Torque) 35 fluctuates around a value of zero. This fluctuation places a stress on the mounting of the gearbox employed, wherein in particular the thickness of a lubrication gap and the lubricant located therein is to be designed to be such that the lubrication gap does not disappear as a result of the fluctuation or oscillation around the value of zero, so that lubrication with the lubricant can take place at all times. As well as the actual torque value 35, the actual rotational speed value (Rot. Speed) 37 is shown too. The nominal rotational speed value (Rot. Speed (Nom)) 38 and the nominal torque value (Torque (Nom)) 36 are shown in addition.

The invention claimed is:

1. A wind gearbox, comprising:
a gearbox including an intermediate shaft having a first shaft end and a second shaft end; and
a mounting for supporting the intermediate shaft, said mounting comprising a gear element disposed between the first shaft end and the second shaft end of the intermediate shaft, a first radial bearing disposed at the first shaft end of the intermediate shaft, a second radial bearing disposed at the second shaft end of the intermediate shaft, a first axial bearing disposed at the first shaft end of the intermediate shaft, and a second axial bearing disposed at the second shaft end of the intermediate shaft, with at least one of the first and second axial bearings being a reversing axial bearing having a lubrication gap of greater than 0.5 mm.

2. The wind gearbox of claim 1, wherein the intermediate shaft is an intermediate shaft of a two-stage spur gear portion of the wind gearbox.

3. A method for operating a wind gearbox comprising a gearbox which includes an intermediate shaft having a first shaft end and a second shaft end, and a mounting for supporting the intermediate shaft, said mounting comprising a gear element disposed between the first shaft end and the second shaft end of the intermediate shaft, a first radial bearing disposed at the first shaft end of the intermediate shaft, a second radial bearing disposed at the second shaft end of the intermediate shaft, a first axial bearing disposed at the first shaft end of the intermediate shaft, and a second axial bearing disposed at the second shaft end of the intermediate shaft, wherein at least one of the first and second axial bearings is a reversing axial bearing, said method comprising selecting a compression time of the reversing axial bearing to correspond to a frequency of a change in load.

4. The method of claim 3, wherein the compression time is selected to be greater than an impact time.

5. The wind gearbox of claim 1, wherein the first radial bearing is a floating bearing.

6. The wind gearbox claim 1, wherein the second radial bearing is a floating bearing.

7. The wind gearbox claim 1, wherein the first axial bearing is fixed in a housing of the gearbox.

8. The wind gearbox claim 7, wherein the second axial bearing is fixed by a cover of the housing.

9. The wind gearbox claim 1, wherein the mounting includes a first oil sump connected to the first axial bearing.

10. The wind gearbox claim 1, wherein the mounting includes a second oil sump connected to the second axial bearing.

11. The wind gearbox claim 1, wherein the first radial bearing has a radial expansion which is smaller than a radial expansion of the first axial bearing.

12. The wind gearbox claim 1, wherein the second radial bearing has a radial expansion which is smaller than a radial expansion of the second axial bearing.

13. The wind gearbox claim 1, wherein the second axial bearing is designed for a number of operating hours which is higher than a number of operating hours of the first axial bearing.

14. The wind gearbox claim 13, wherein the second axial bearing is designed for a number of operating hours which is double a number of operating hours of the first axial bearing.

15. The wind gearbox claim 1, wherein the first axial bearing abuts a first shaft end face and/or the second axial bearing abuts a second shaft end face.

16. The wind gearbox claim 15, wherein at least one of the first and second shaft end faces is adapted by a thrust washer to a corresponding one of the first and second axial bearings.

* * * * *